US008935801B1

(12) United States Patent
Pham

(10) Patent No.: US 8,935,801 B1
(45) Date of Patent: *Jan. 13, 2015

(54) SOFTWARE CODE ANALYSIS AND CLASSIFICATION SYSTEM AND METHOD

(71) Applicant: Andrew T. Pham, Modesto, CA (US)

(72) Inventor: Andrew T. Pham, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,290

(22) Filed: Jan. 21, 2013

Related U.S. Application Data

(63) Continuation of application No. 12/572,215, filed on Oct. 1, 2009, now Pat. No. 8,359,655.

(60) Provisional application No. 61/102,707, filed on Oct. 3, 2008.

(51) Int. Cl.
*G06F 21/00* (2013.01)
*G06F 21/12* (2013.01)

(52) U.S. Cl.
CPC .................................... *G06F 21/12* (2013.01)
USPC .............. 726/26; 726/32; 713/154; 709/201; 380/201; 705/51

(58) Field of Classification Search
USPC ............................................................ 726/26
See application file for complete search history.

(56) References Cited

U.S. PATENT DOCUMENTS

| | | | |
|---|---|---|---|
| 6,343,280 B2 * | 1/2002 | Clark | 705/55 |
| 7,647,579 B2 * | 1/2010 | Drissi et al. | 717/114 |
| 7,870,075 B1 * | 1/2011 | Sabet | 705/52 |
| 2009/0055933 A1 * | 2/2009 | Samuel | 726/26 |

* cited by examiner

*Primary Examiner* — Morshed Mehedi
(74) *Attorney, Agent, or Firm* — Meunier Carlin & Curfman, LLC

(57) ABSTRACT

Methods for scanning software for the existence of a licensing condition. Software may be uploaded, scanned and compared against known software stored in a datastore. If the uploaded software matches known software in the datastore, a license associated with the known software may be determined. The license may have information associated with it, such as a classification based on risk and obligations. The classification of the license, as well as the obligation information may be returned as a report to a requester that uploaded software to easily identify the risks associated with incorporating the software into a larger code base or project.

9 Claims, 7 Drawing Sheets

SOFTWARE CODE ANALYSIS AND CLASSIFICATION SYSTEM AND METHOD

CROSS-REFERENCE TO RELATED APPLICATIONS

The present application is a continuation of U.S. patent application No. 12/572,215, filed Oct. 1, 2009, entitled "SOFTWARE CODE ANALYSIS AND CLASSIFICATION SYSTEM AND METHOD." The present application also claims priority to U.S. Provisional Application No. 61/102,707, filed Oct. 3, 2008, entitled "CODE ANALYSIS SYSTEM." The above-referenced applications are incorporated herein by reference in their entireties.

BACKGROUND

Free or open source software (hereinafter "FOSS" or collectively "open source") may seem at first glance to offer significant benefits, but there are potential pitfalls that may have serious legal consequences. FOSS is the concept that an expressive work may be better utilized and developed by allowing open access to the source code. The theory is that more eyes looking at the code will result in faster discovery and correction of errors than the traditional closed source code system. Issues raised by open source development and licensing may encompass many different bodies of law.

Under the terms of certain licenses, incorporating FOSS code in a project could force a company to release the entire project as open source under the same license. That result could be devastating to the project's commercial value and the company. Even under licenses with friendlier terms, without following the proper procedures, a developer may unknowingly incorporate code that infringes another's rights. Additionally, most open source licenses have disclosure requirements triggered by the further distribution of that code. In short, incorporating open source may force a company to assume liability for that code.

SUMMARY

A system and methods for analyzing and classifying software code. The system and methods may be utilized to assist companies in safeguarding company Intellectual Property and source code, and reduce potential liability involved in the use of open source and other third party codes. Using open source code or third party software code however, may be beneficial in terms of cost savings and speed of project development. Therefore, the system and method disclosed herein also encourages the use of open source code, third party, or reusable components as long as it does not affect company Intellectual Property rights or unduly increase liability.

In accordance with some implementations, methods for scanning software for the existence of a licensing condition or other restrictions, including restrictions based on company policies, industry or community standards, or government regulations, are provided. Software may be uploaded, scanned and compared against known software stored in a datastore or available through the Internet. If the scanned software matches known software in the internal or external datastore, a license or other restrictions associated with the known software may be determined. The license or restriction may have information associated with it, such as a classification based on risk, obligations, or terms or conditions of the license associated with the software. The classification of the license or restriction information, as well as the obligation information may be returned as a report to a requester to easily identify the risks associated with incorporating the software into a larger code base or project.

In accordance with some implementations, a method of managing a software codebase is provided. The method may include indentifying a software object to be included within the software codebase, and determining if the software object is subject to a license restriction. Next, the software object may be analyzed to classify or categorize the software object into a class or category based on the license, the license restriction, a default policy, a company policy, an industry or community standard, or a government regulation. A determination of a use of the software object in accordance with the class or a policy may be made from which compliance actions may be generated based on the use, policy or the class/category.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Like reference numbers and designations in the various drawings indicate like elements.

DETAILED DESCRIPTION

Figure 1:
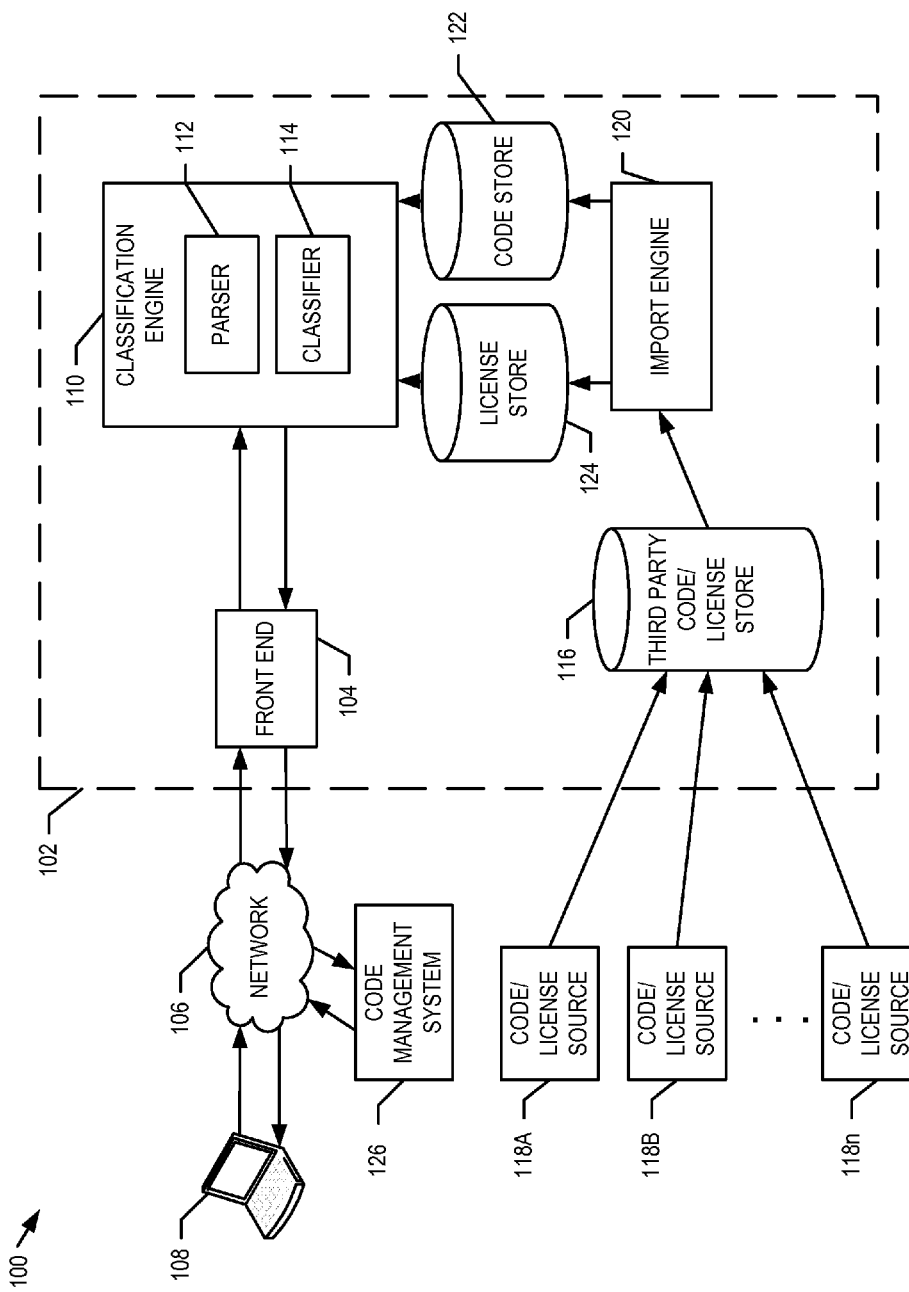
FIG. 1 is a block diagram of an example environment in which a software recognition engine may be configured to analyze and classify software code and the licenses associated therewith.

FIG. 1 is a block diagram of an example environment 100 in which a software recognition engine 102 may be configured to analyze and classify or categorize software code and the licenses associated therewith. In some implementations, the software recognition engine 102 may be configured to recognize software source code that uses open source code or third party software code. For example, many open source licenses are crafted to enforce so-called "copyleft" provisions. "Copyleft" refers to a licensing scheme for making a program or other work free, together with a requirement that all modified and extended versions of the program (i.e., derivative works)to be free as well. The software recognition engine 102 may use "copyleft" as the framework to define "classes" of licenses based on the strength of their respective "copyleft" provisions. In other words, licenses may be categorized based on the extent to which a license requires derivative work to use the same license upon distribution. As will be described below, the software recognition engine 102 may be used as part of a cooperative process between open source developers, licensing entities and commercial software developers to encourage the use of open source software and licensing, while protecting commercial interests.

Some implementations herein contemplate three classes of free and open source licenses. "Class A" licenses place no requirement on derivative works to use the same open source license as the code from which it is derived. Thus, a developer using code governed by a Class A license may use the code to create virtually any work, in any way, and then use any kind of licensing he or she desires for the derivative work. However, a Class A license may impose some conditions when distributing the code, such as requiring that the derivative work credit the original author of the open source code (i.e., attribution language), or that the creator of the derivative work agree not to sue the original author under certain circumstances, or that prominent notices be included if the original code has been modified. Many open source licenses impose obligations using the attribution provision, which are very similar to the reproduction of legal notices. This language is often incorporated, e.g., in the "About" box, as part of the commercial products.

"Class B" Licenses, like Class A licenses, allow developers to use the open source code to create virtually any work, in any way. Class B licenses assume, however, that these derivative works will be made up of source files that will ultimately become a single binary file. In addition, Class B licenses require that any such source file that contains the open source code must be licensed with the same license. Class B licenses do not, however, impose this requirement on files that do not contain code from the original open source code; those files may be licensed in any way the developer wishes. As such, the developer only has to apply Class B license restrictions to a file that contains the original code or modifications to it; the developer's own independently developed files are not subject to any such requirement.

"Class C" Licenses, like Class A and Class B licenses, allow developers to use code from the open source project to create virtually any work, in any way. In addition, like Class B licenses, Class C licenses require any file that contains code derived from the open source project to be licensed under the same license as the open source project. However, Class C licenses also require that any file, regardless of code origin, which is combined, under certain circumstances, with the open source file must be licensed under the same license as the open source project. The desired effect of this is to make as much free software as possible available publicly, and in a practical way, through the open source project. While Class B licenses may be termed file-based licenses, Class C licenses may be termed project-based licenses because the effect is to license all files in the project under one license. If a file is derived from (or possibly combined with)a Class C-licensed project, the entire work must be licensed under that same Class C license.

As defined above, software code governed by a license classified in Class C may be reviewed more carefully before use, while software code governed by a license under Class B may be used in commercial company projects under the appropriate conditions. Licenses under Class A are generally considered "safe" open source for commercial enterprises.

Referring again to FIG. 1, the software recognition engine 102 includes a front-end server 104 that interfaces with a network 106. The front-end server 104 may be, for example, a web server that communicates with one or more client computers 108 over the Internet. Alternatively, the front-end server 104 may be a file server or other interface to the software recognition engine 102. The network 106 may be an intranet, the Internet, a local area network (LAN), a wide area network (WAN), a wireless fidelity (WiFi)network, a public switched telephone network (PSTN), a cellular network, a voice over Internet protocol (VoIP)network, and the like in order to provide communications between the client computer(s)108 and the software recognition engine 102.

The software recognition engine 102 may be run on a number of platforms, including AIX, z/O S, Linux, H P-U X, Solaris and Windows. It may handle large binary files, large numbers of files, and large repository sizes. The front-end server 104 can, for example, provide hypertext markup language formatted web pages to a web browser of the computer 108. The web browser of the computer 108 may interpret these web pages for display on the computer 108. The displayed web pages may function as a user interface to the software recognition engine 102. The front-end server 104 may also provide an interface to a client application executing on the client computer 108 that locally provides the user interface functionality.

The front-end server 104 may accept information from the client computer 108 that may include, for example, software source code or binary files to be analyzed. The information may be passed to the classification engine 110 for processing. Generally, the classification engine 110 works with an index of open source software code and licenses to scan for instances of open source software code within a received software source code. In some implementations, the classification engine 110 may categorize and summarize risks associated with determined results. For example, the classification engine 110 may identify one or more licenses associated with input software source code and/or a classification of the licenses associated with the input software source code.

Individual results in a set of results may be ordered according to a the license classifications and/or a severity of risks determined by the classification engine 110. A result set may be delivered to the client computer 108 as a complete set of results or delivered in segments. For example, the results may include only "Class C" licenses identified as being associated with software code received by the software recognition engine 102 for analysis.

The classification engine 110 includes a software code parser 112 and a software classifier 114 for analyzing the received software code. The software code parser 112 may accept the input software source code and parse it into smaller segments for analysis based on predetermined criteria. For example, the input software source code may be thousands of lines of code in many files. The software code parser 112 may operate on the input software source code on a line-by-line bases, or a file-by-file basis.

The software classifier 114 accepts the parsed source code from the software code parser 112 and determines an appropriate classification for the software code under examination. For example, the software classifier 114 may access a code datastore 122 and/or license datastore 124 to make the classification. The code datastore 122 may be a repository of software source code indexed by the software recognition engine 102. The source code indexed in the code datastore 122 may be broken into constituent parts (e.g., files, objects, lines of code, etc.)and may be associated with a license under which the source code is distributed. The license datastore 124 may contain, for example, a database of software licenses, classifications thereof(e.g., Class A, Class B, Class C, etc.), other limitations, etc. The code datastore 122 and the license datastore 124 may be implemented as one datastore.

In some implementations, the code datastore 122 and/or license datastore 124 may store and track information such as:

An identifier of an open source product.
A product version.

A publisher/manufacturer.

A company product(s) and subsystem utilizing component (including product version).

A file name of the open source product.

A license agreement (include license version, if applicable).

A class, if known, of the open source (e.g., Class A, B or C).

A company product version.

A copy of the license agreement.

Attribution requirements.

Additional information that may be added or supplied by users may include:

An identify the source/provider (company developer's name).

A described use/purpose.

An identified use (e.g., embedded, separate file, or internal development).

An identified type (e.g., library, utility, or development tool).

An identification of modifications, if any.

An identification of a website or other repository for retrieving information (e.g., downloads, updates, license, etc.)

As such, the classification engine 110 may identify one or more licenses and classifications associated therewith using the code datastore 122 and/or the license datastore 124 to return results to the client 108 through the front-end server 104. In some implementations, using information from the code datastore 122 and/or the license datastore 124, the software recognition engine 102 may recommend actions or remediation plans (e.g., removal, alternatives or commercial) based on the determined classification and/or compliance options with license requirements.

Submissions to the code datastore 122 and license datastore 124 may be made voluntarily by external code/license sources 118A. 118n or by internal sources associated with the software recognition engine 102 (e.g., an internal staff). In some implementations, the external code/license sources 118A. 118n may upload software source code, code snippets, licenses, etc. to the software recognition engine 102 using a defined interface in order to enable the software recognition engine 102 to determine the presence of their respective software and/or license within the input software source code. Examples of the code/license sources 118A. 118n may include, but are not limited to, individual software developers, software code community hosts (e.g., sourceforge.net, Google code, etc.), licensing entities and aggregators (e.g., the Open Source Initiative, Free Software Foundation, Licensing Executives Society, etc.).

The defined interface used by the code/license sources 118A. 118n may be a structured XML (eXtensible Markup Language) interface that enables code/license sources 118A. 118n to provide software code, license terms, attribution terms, other restrictions/uses, patent information, etc. to the software recognition engine 102.

In order to verify the submissions from the code/license sources 118A. 118n, the submissions may be initially stored in a third party code/license datastore 116, that is not part of the production code datastore 122 and/or the license datastore 124. For instance, a particular code/license source 118 may provide the following code:

```
#include<stdio.h>
main( )
{
    printf("Hello World");
}
```

The code/license source 118 may also indicate that the code is in the C++ programming language and the associated license is "none," i.e., it is in the public domain.

Another different code/license source 118 may submit a complete license associated with one or more software programs distributed by the code/license source 118, together with a listing of the software program source code. The code/license source 118 may also submit license information in an effort to promote use of a particular license as being favorable to commercial or open source developers.

An import engine 120 may perform preprocessing of the submissions from the code/license sources 118A. 118n stored in the third party code/license datastore 116 in order to verify the submission prior to placing them into the production code datastore 122 and/or the license datastore 124. The import engine 120 may apply rules to the submissions in the third party code/license datastore 116 to verify the accuracy and completeness of the submissions, communicate with the code/license source 118 if additional information is necessary, and/or to commit the submissions to the production code datastore 122 and/or the license datastore 124.

As shown in FIG. 1, the environment 100 may include a software development and code management system 126. The software development and code management system 126 may interact with the software recognition engine 102 as part of its version control, workspace management, development support and build auditing. The code management system 126 may be, e.g., Rational ClearCase offered by IBM, Corporation of Armonk, N.Y.

Table 1, below, provides an example classification-to-license-to-recommendation mapping in accordance with implementations described herein.

TABLE 1

| Classification | Open Source License | Status |
|---|---|---|
| Class A Unrestricted Non-copyleft | New BSD License (Berkeley Software Distribution), M IT License, X11 License, Apache 2.0 License, Academic Free License, Educational Community License, Attribution Assurance License, Eiffel Forum License 2.0, Fair License, Lucent Public License, University of Illinois/NCSA O pen Source License, zlib/libpng License, EU DataG rid Software License, Entessa Public License 1.0, NAU M EN Public License, PH P License 3.0, Vovida Software License, Zope Public License 2.0, Castor License, JDOM License, STLPort License, DO C Software License (for ACE, TAO, and JacO RB), JavaBeans License, jclark License, xslp License, G NU gettext License, Jaxen License, tclib License, Boost Software License, SAX Project (public domain), WinPcap License, XDoclet License, Jikes License, Java Service W rapper License* (non-G PL version only), SQLite License, Microsoft Permissive License (M s-PL) and all licenses said to be "BSD compatible." | recommends generally "safe" for commercial enterprises |
| Class B File-based copyleft | Lesser General Public License (LG PL or also known as Library General Public License), Mozilla Public License (MPL), Common Development and Distribution License (CDDL), Eclipse | recommends company legal to review |

TABLE 1-continued

| Classification | Open Source License | Status |
|---|---|---|
| | Public License (EPL), NASA Open Source Agreement 1.3, Open Group Test Suite License, Sun Public License, Sybase Open Source License, wxWindows Library License, and Microsoft Community License (Ms-CL). | license and use. |
| Class C Project-Based Copyleft | General Public License (GPI - all versions), Open Software License, Common Public License (CPI), Open Public License, Reciprocal Public License, Artistic License, Adaptive Public License, Open Source License 3.0, Apple Public Source License. Computer Associates Trusted Open Source License, CUA Office Public License 1.0, Frameworx License, IBM Public License, Motosoto Open Source License, Nokia Open Source License, OCIC Research Public License 2.0, Python License, Python Software Foundation License, RealNetworks Public Source License, Ricoh Source Code Public License, Sleepycat License, and Microsoft Reference License (Ms-RI). | cautions against using these licenses in proprietary software. |

Thus, the environment 100 may be used by entities to protect intellectual property rights and source code, minimize liability, assist in compliance and transactions, and promote awareness and use of open source. For example, internal auditing and quality review processes may be implemented in the environment 100. A company may scan its own code for open source, e.g., legal oversee review of open source uses, and for open source enforcement purposes.

Other uses of the environment 100 may include merger and acquisition diligence. The environment 100 may be used to scan a target's source codes to determine for open source. It is common for 60-80% of a company's value to be in IP. Without proper due diligence, the company being acquired may be worthless or reduced to 20% -physical assets only—as improper use of Open Source may render it worthless.

Yet another application within the environment 100 is outsourcing quality review. Outsourcing is becoming popular as many companies seek to reduce costs, offload, or off-shore non-core competency. However, before these entities may accept work product or codes from a third party, it is necessary to scan it to ensure that it complies with open source policy and that unwanted liabilities are not accepted. Yet another related application within the environment 100 is software development. Managers and developers may use this as an everyday tool to scan for open source, to look for open source, and to find alternatives. Other uses include scanning to determine efficiency of code development or scripting.

Another application within the environment 100 is for use with government compliance. Often, government agencies require the disclosure of open source within your product. Yet another application of the environment 100 is copyright infringement/dispute resolution. The environment 100 may be used to search for specific codes or sections, to identify instances of open source, to identify copyright infringement, to assist in prosecution or defense of patent infringement.

In addition, the environment 100 disclosed herein may perform encryption scanning and provide export control reports and filings, perform a quality of code review (e.g., efficiency of codes), or find specific sets of codes (e.g., copyright infringement/dispute).

As is evident to one of ordinary skill in the art, many uses of the environment 100 are possible with regard to software development, licensing, and enforcement. For example, the classification engine 110 may match licenses rather than software code. In addition, a developer may use the database to search for codes in a certain category/class of license, or based on a list of open source component names, returning a class or category for each listed component or matching the components with components in the database (without using the source code).

Further, the classification engine 110 framework may be tailored as necessary to be based on a different premise (i.e., some trait of the software source code other than a licensing provision, such as language, platform, compile time, dependencies, etc.). In addition, a different number of classifications may be defined.

Figure 2:
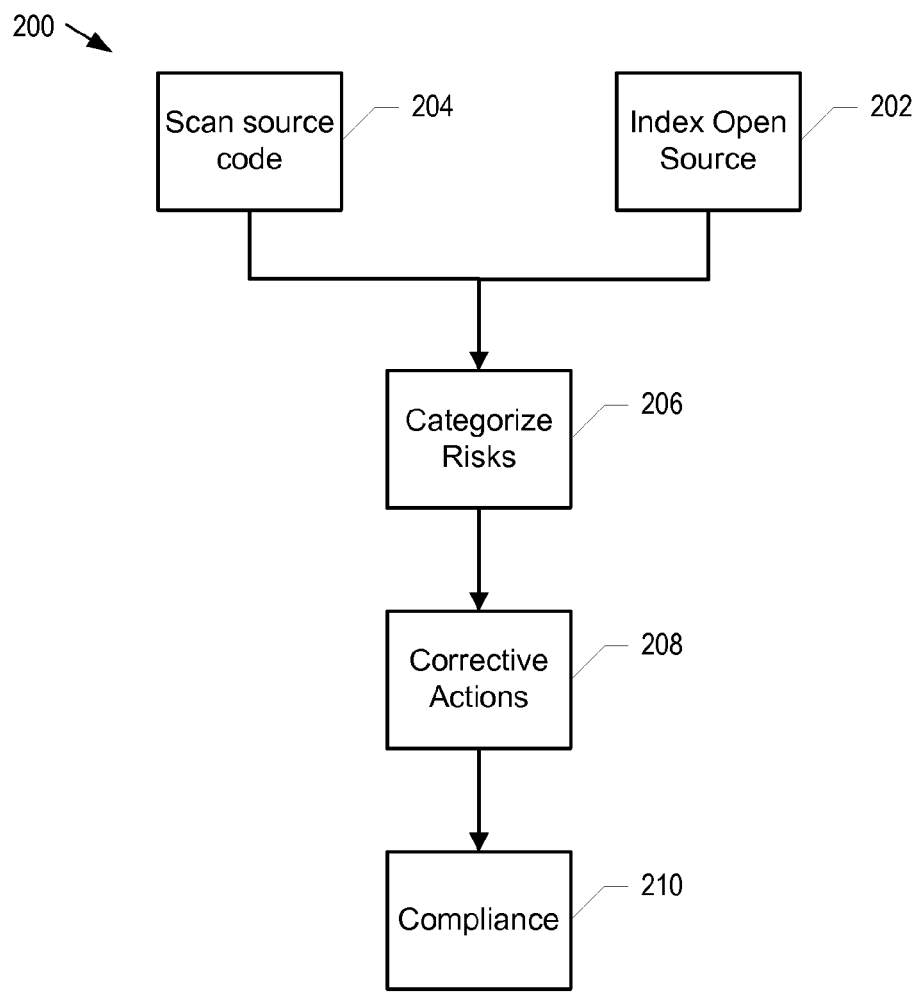
FIG. 2 is illustrated an example flow diagram of processes performed within a basic structure of the environment.

Referring now to FIG. 2, there is illustrated an example flow diagram 200 of processes performed within a basic structure of the environment 100. At 202, open source software is indexed. For example, source code may be provided by code/license sources 118A. 118n to the third party code/license data store 116. Submissions may be imported by the import engine 120 and stored in either the license datastore 124 or the code datastore 122 in accordance with a type of information submitted and imported. The indexing process may be applied against the submissions from one or more code/license sources or internal sources to determine a license associated with a particular piece of software source code and/or classify the license into one of the classifications described above. The licenses and their respective classifications may be stored in the license datastore 124 for use by the classification engine 110.

At 204, submitted source code is scanned. Scanning of source code at 204 may be performed contemporaneously or at different times than the indexing at 202. The source code may be submitted by the client 108 to the front-end server 104. Scanning of source code may be performed by the classification engine 110, as described above. For example, the source code may be parsed by the parser 112 and compared with source code stored in the code datastore 122. The classifier 114 may use the results of the comparison to determine a license associated with the submitted source code and/or a "class" of the determined license (e.g., Class A).

At 206, risks are categorized. Based on the determined class of license, the classification engine 110 may provide a listing of the various risks associated with the submitted software code. For example, Table 1 includes status column for each of the classes of licenses. The status indicated for each particular license class may be linked to additional information in the license datastore 124 that identifies risks of the associated license. The risks may be tailored by individual users of the software recognition engine 102. For example, some entities may have an outright prohibition against use of software distributed under "Class C" licenses.

At 208, corrective actions may be provided. The software recognition engine 102 may provide recommendations to remediate or correct the risks identified at 206. For example, a recommendation may be made to the client 108 to find alternative software source code to replace software found to be licensed under a "Class C" license. The alternative source code may be licensed under either a "Class A" or "Class B" license, or may be developed internally using a "clean room" approach.

At 210, license compliance requirements may be presented. For example, if attribution is required under the license associated with the input source code, the software recognition engine 102 may indicate that an attribution must be provided in a README file (or elsewhere) associated with any software that utilizes the submitted source. Thereafter, the process ends.

Figure 3:
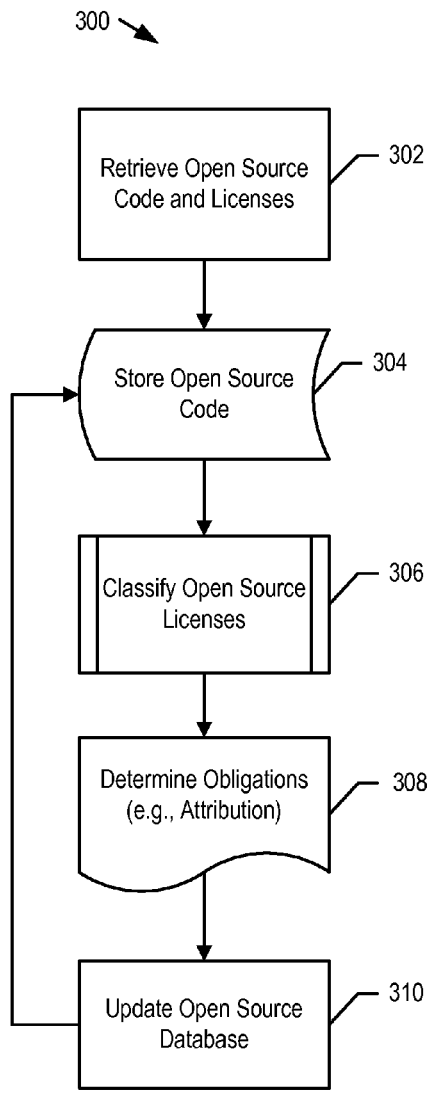
FIG. 3 illustrates an example flow diagram of processes performed to populate a license datastore and/or the code datastore.

FIG. 3 illustrates an example flow diagram 300 of processes performed to populate the license datastore 124 and/or the code datastore 122. At 302, open-source code and/or licenses are retrieved. The open-source code and licenses may be retrieved from the third party code/license database 116 or from another source (not shown).

At 304, the open source code is stored. For example, after the source code and/or licenses are retrieved from the database 116 and imported by the import engine 120, the imported software code may be stored in the code datastore 122. Imported license information may be stored in the license datastore 124.

At 306, licenses are classified. Licenses may be classified in several ways. For example, the license source (e.g., one of code/license sources 118)may classify their submitted license. In some implementations, the classification may be performed automatically by the import engine 120. The import engine 120 may apply certain rules or recognize certain license terms to determine a classification of a submitted license. In other implementations, the classification may be a manual process whereby legal professionals, or other individuals review a license and classify it into an appropriate category. Further, the classification may be a combination of any of the above.

At 308, obligations are determined. For example, it may be determined if the retrieved license requires an attribution in any derivative works.

At 310, the license database is updated. The license datastore 124 may be updated to include the submitted license and its associated classification and obligations. This information may be run against submitted software code to determine risks, obligations and licensing associated with the use and distribution of such software code. Thereafter, the process ends.

Figure 4:
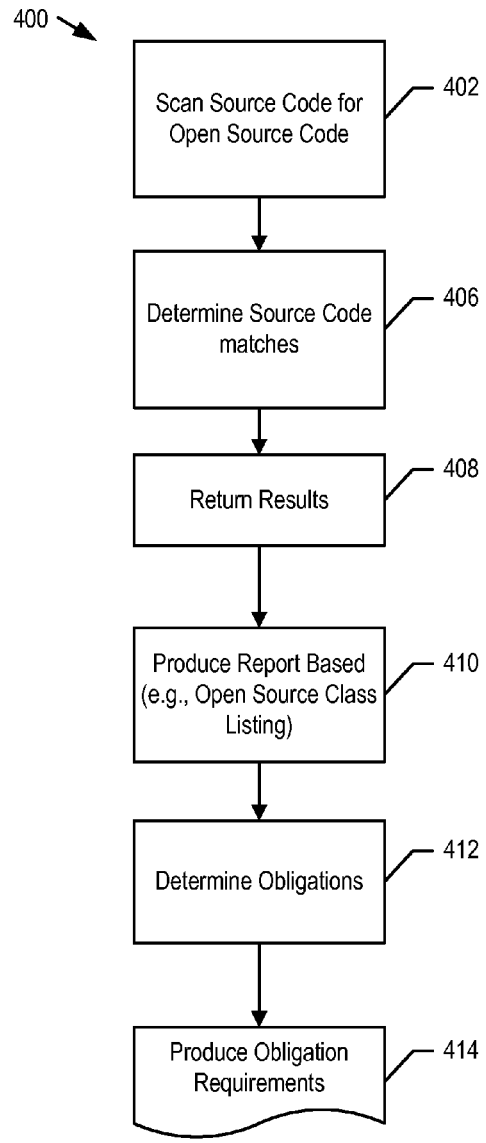
FIG. 4 is a flow diagram of a process to scan software.

FIG. 4 is a flow diagram 400 of a process to scan software. At 402, software is submitted and scanned for presence of open source software. The submitted software may originate from the client 108 and be provided through the front-end server 104 to the software recognition engine 102. The code may be scanned by the parser 112 and compared against code stored in the code datastore 122.

At 406, source code matches are determined. The parser 112 may determine that the code submitted at 402 matches one or more known entries in the code datastore 122. The matches may then be passed to the classifier 114 to determine the classes of licenses that apply to the matched code.

At 408, results are returned. The determined classes of licenses may be returned to the classification engine 110, which at 410, may produce a report to be communicated to the client 108.

At 412, obligations of the licenses classified at 408 may be determined. In addition or alternatively to the classification, the obligation requirements (e.g., attribution) may be produced at 414. These requirements may be communicated to the client 108. Thereafter, the process ends.

Figure 5:
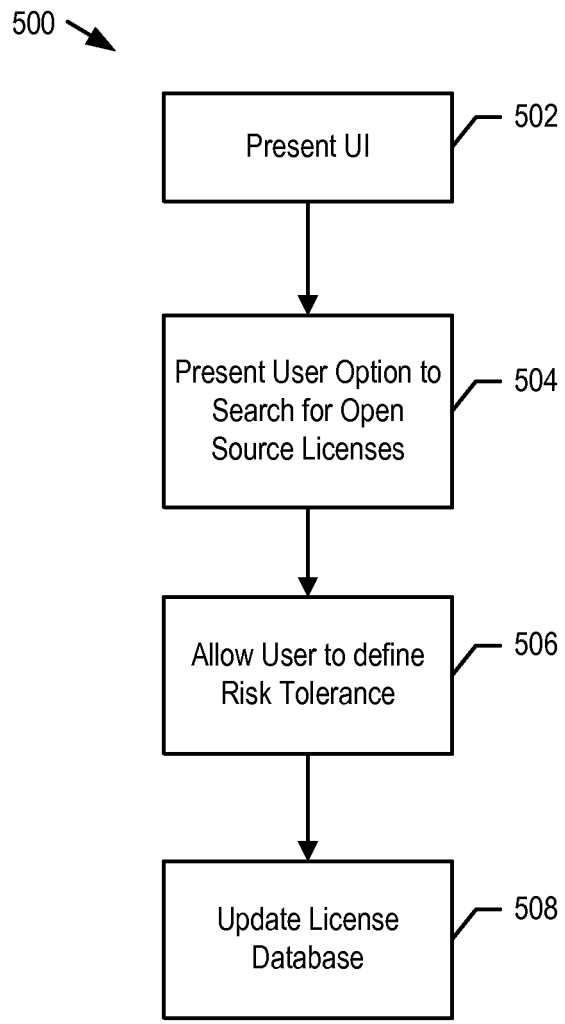
FIG. 5 is a flow diagram of processes to configure the software recognition engine.

FIG. 5 is a flow diagram 500 of processes to configure the software recognition engine 102. At 502, the software recognition engine 102 may provide a user interface to the client 108 through the front end 104. Alternatively, a client application executing on the client 108 may present the user interface.

At 504, the user interface may include options to search for open source licenses stored in the license datastore 124. At 506, a user interface may be provided to allow a user to define a risk tolerance for the various categories of licenses. For example, different entities may have different risk tolerances. Companies whose assets are software may have a lower tolerance for risk, as compared to companies who wish to promote open source software.

At 508, the license database may be update to reflect the risk tolerance. Thereafter, the process ends.

Figure 6A:
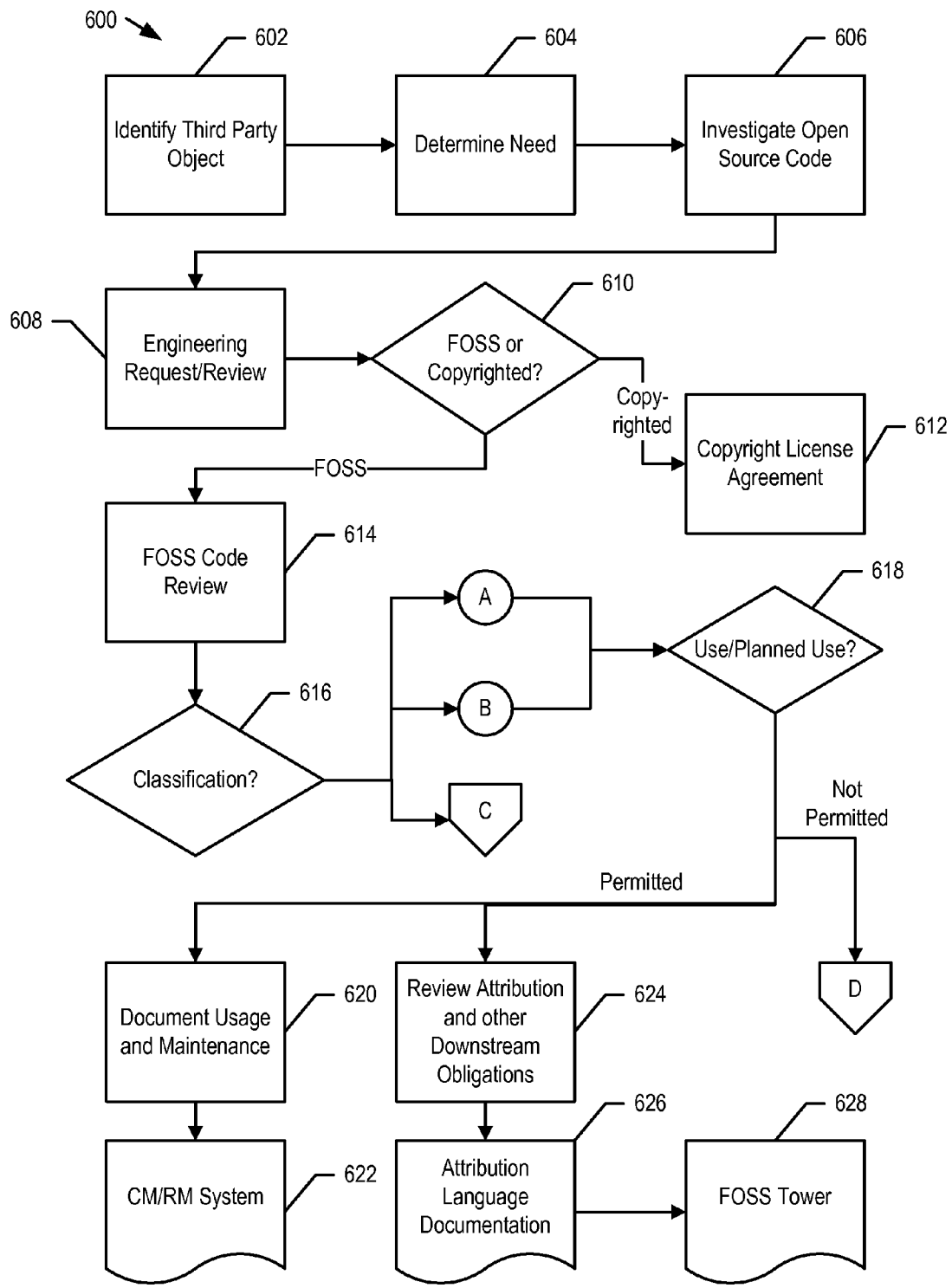
FIGS. 6A and 6B are flow diagrams of processes to determine and mitigate risks associated with the integration of open source software into a code base
Figure 6B:
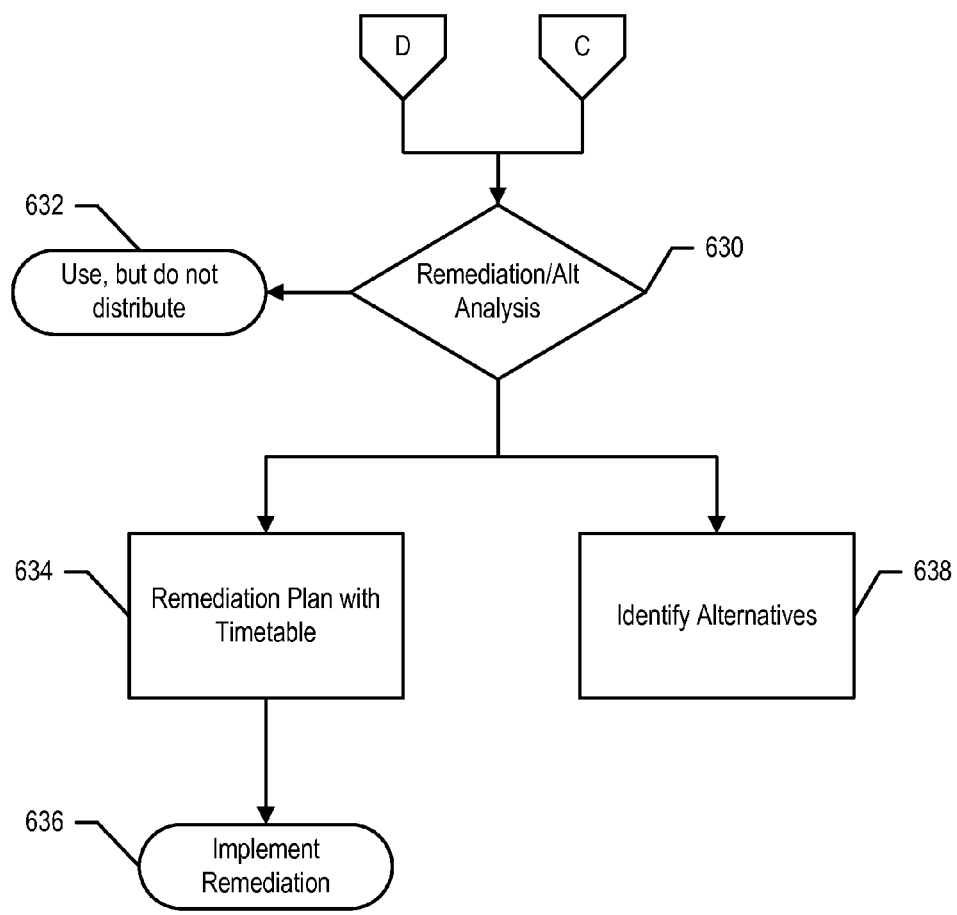

FIGS. 6A and 6B are a flow diagrams 600 of processes to determine and mitigate risks associated with the integration of open source software into a code base. At 602, a third party object is identified. The third party object may be software identified by a developer as code that may be useable within the code base in accordance with a need ascertained at 604.

At 606, an investigation may be made to determine if the identified code is open source code. At 608, an engineering request/review of the code may be performed. At 610, the engineering review or investigation may determine if the code is open source (FOSS)or copyrighted. If copyrighted, then at 612, appropriate rights may be obtained through an agreement with the copyright holder to use and redistribute the code.

If the code is FOSS, then at 614, a review may be performed. The review may be performed in accordance with the operational flow 400 described above to determine a classification at 616. If the determined classification is "Class A" or "Class B," then at 618, the use or planned use of the third party object is determined.

If the use or planned use is permitted, then at 620, usage and maintenance of the software code is documented. At 622, the usage and documentation information may be maintained by the configuration management/records management system. At 624, attribution and obligations associated with the license classified at 616 are reviewed, if necessary. At 626, attribution language documentation is created and maintained. The proper attribution is provided within the code base in accordance with the obligations at 624.

At 628, the software may be added to a repository of FOSS software that is usable by developers within the entity.

Returning to 616 or 618, if the determined classification is "Class C" or the use of the third party object is not permitted, respectively, then the process continues at 630 in FIG. 6B. At 630, it is determined what, if any, remediation or alternative analysis should be undertaken. For instance, a decision may be made at 632 to use the source code, but not to distribute the codebase in order to avoid obligations under the "Class C" license. Other alternatives include at 634 and 636, defining and implementing a remediation plan and timetable. Alternatives to the source code may be determined at 638.

Thus, as described above, the software recognition engine 102 and implementations thereof may be used to identify and managing risks of incorporating source code into an entity's codebase.

Figure 7:
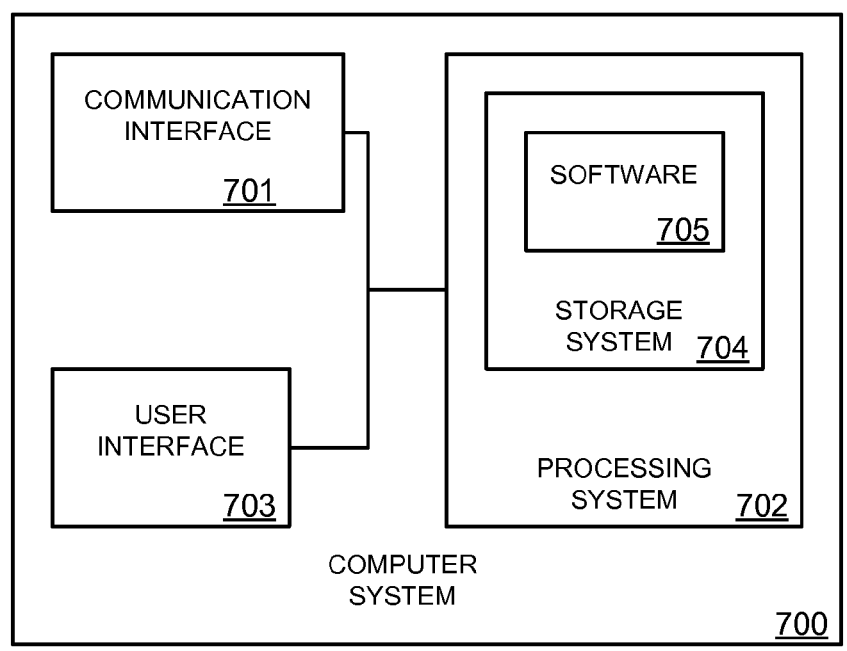
FIG. 7 is a block diagram illustrating a computer system configured to operate as described herein for a code analysis system.

FIG. 7 is a block diagram illustrating a computer system configured to operate as described herein for a code analysis system. Computer system 700 includes communication interface 701, processing system 702, and user interface 703. Processing system 702 includes storage system 704. Storage system 704 stores software 705. Processing system 702 is linked to communication interface 701 and user interface 703. Computer system 700 could include a programmed general-purpose computer, although those skilled in the art will appreciate that programmable or special purpose circuitry and equipment may be used. Computer system 700 may be distributed among multiple devices that together make up elements 701-705.

Communication interface 701 could include a network interface, modem, port, transceiver, or some other communication device. Communication interface 701 may be distributed among multiple communication devices. Processing system 702 could include a computer microprocessor, logic circuit, or some other processing device. Processing system 702 may be distributed among multiple processing devices. User interface 703 could include a keyboard, mouse, voice recognition interface, microphone and speakers, graphical display, touch screen, or some other type of user device. User interface 703 may be distributed among multiple user devices. Storage system 704 could include a disk, tape, integrated circuit, server, or some other memory device. Storage system 704 may be distributed among multiple memory devices.

Processing system 702 retrieves and executes software 705 from storage system 704. Software 705 may include an operating system, utilities, drivers, networking software, and other software typically loaded onto a computer system. Software 705 could include an application program, firmware, or some other form of machine-readable processing instructions. When executed by processing system 702, software 705 directs processing system 702 to operate as described herein for a code analysis system.

The subject matter and the functional operations described in this specification may be implemented in digital electronic circuitry, or in computer software, firmware, or hardware, including the structures disclosed in this specification and their structural equivalents, or in combinations of one or more of them. The subject matter described in this specification may be implemented as one or more computer program products, i.e., one or more modules of computer program instructions encoded on a tangible program carrier for execution by, or to control the operation of, data processing apparatus. The tangible program carrier may be a computer readable medium. The computer readable medium may be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code)may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may be implemented as, special purpose logic circuitry, e.g., an FPGA (field programmable gate array)or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS)receiver, to name just a few.

Computer readable media suitable for storing computer program instructions and data include all forms of non-volatile memory, media and memory devices, including by way of example semiconductor memory devices, e.g., EPROM , EEPROM , and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, implementations of the subject matter described in this specification may be implemented on a computer having a display device, e.g., a CRT (cathode ray tube)or LCD (liquid crystal display)monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for analyzing source code for the existence of a licensing condition to provide a classification, comprising:
   storing source code and license information in a datastore, the source code having a license associated therewith and the license information including a classification of each license stored in the datastore, the classifications of the licenses being based on an attribute of the licenses, wherein the classifications define at least one term or condition associated with each class of licenses, and wherein the attribute of the licenses is a requirement of how a derivative work of the source code is to be licensed;
   receiving input software code to be analyzed for the at least one term or condition;
   parsing the input software code to determine if a portion of the input software code matches source code in the datastore;
   determining licenses associated with the portion of the input software code that match the source code to ascertain the classifications of the licenses; and
   generating an output report containing determined licenses associated with the portion of the input software code, the output report including a recommendation regarding usage of the portion of the input software code based on a classification of each determined license.

2. The method of claim 1, further comprising defining the classifications of the licenses based on an attribute of the licenses that applies to a population of licenses stored in the datastore.

3. The method of claim 1, wherein, the classification of the licenses, further comprises:
   defining a first class wherein there is no requirement that derivative works use the same open source license as original code from which it is derived;
   defining a second class wherein derivative works that contain code from the original code from which it is derived must be licensed with the same license, but however, files that do not contain the original code may be licensed in any manner; and
   defining a third class wherein any file that is combined with the original code must be licensed under the same license as the original code.

4. The method of claim 1, further comprising determining obligations associated with the licenses, wherein the obligations include one of attribution requirements and a waiver of warranty.

5. The method of claim 4, further comprising generating the output report containing the obligations.

6. The method of claim 1, further comprising:
   providing a user interface to a client device, the user interface enabling a definition of risks and classifications of licenses; and
   updating the datastore in accordance with the definition.

7. The method of claim 1, further comprising:
   receiving the source code and the license information from third party sources; and
   verifying the source code and the license information for population into the datastore.

8. The method of claim 1, wherein the third party sources comprise one of developers, software repositories and licensing entities.

9. The method of claim 1, further comprising integrating the method of analyzing source code with a software configuration management tool.

* * * * *